(12) United States Patent
Saund et al.

(10) Patent No.: US 8,649,286 B2
(45) Date of Patent: Feb. 11, 2014

(54) QUALITY OF SERVICE (QOS)-RELATED FABRIC CONTROL

(75) Inventors: Gurjeet S. Saund, Saratoga, CA (US);
Sukalpa Biswas, Fremont, CA (US);
Brijesh Tripathi, San Jose, CA (US)

(73) Assignee: Apple Inc., Cupertino, CA (US)

( * ) Notice: Subject to any disclaimer, the term of this patent is extended or adjusted under 35 U.S.C. 154(b) by 194 days.

(21) Appl. No.: 13/008,180

(22) Filed: Jan. 18, 2011

(65) Prior Publication Data
US 2012/0182889 A1    Jul. 19, 2012

(51) Int. Cl.
*G06F 13/38* (2006.01)

(52) U.S. Cl.
USPC ........................... 370/252; 710/107; 710/113

(58) Field of Classification Search
USPC ................................. 710/123, 305
See application file for complete search history.

(56) References Cited

U.S. PATENT DOCUMENTS

| | | | |
|---|---|---|---|
| 5,581,703 A | 12/1996 | Baugher | |
| 6,295,281 B1 * | 9/2001 | Itkowsky et al. | 370/293 |
| 6,597,691 B1 | 7/2003 | Anderson | |
| 6,628,609 B2 | 9/2003 | Chapman | |
| 6,754,179 B1 * | 6/2004 | Lin | 370/235 |
| 6,947,970 B2 | 9/2005 | Berry | |
| 6,965,563 B1 | 11/2005 | Hospodor | |
| 7,145,904 B2 | 12/2006 | Zhao | |
| 7,155,554 B2 | 12/2006 | Vinogradov | |
| 7,161,904 B2 | 1/2007 | Hussain et al. | |
| 7,277,975 B2 | 10/2007 | Vinogradov | |
| 7,350,028 B2 | 3/2008 | Cameron | |
| 7,469,309 B1 | 12/2008 | Duncan et al. | |
| 7,480,304 B2 | 1/2009 | Yeh et al. | |
| 7,548,545 B1 | 6/2009 | Wittenschlaeger | |
| 7,570,651 B2 | 8/2009 | Haghighi | |
| 7,593,329 B2 * | 9/2009 | Kwan et al. | 370/230 |
| 7,596,139 B2 | 9/2009 | Patel | |
| 7,621,162 B2 | 11/2009 | Bartky | |
| 7,660,931 B2 | 2/2010 | Hayter | |
| 7,675,926 B2 | 3/2010 | Olsen et al. | |
| 7,715,377 B2 | 5/2010 | Mick | |
| 7,801,045 B2 | 9/2010 | Mathews | |
| 7,948,883 B1 * | 5/2011 | Croft et al. | 370/230 |
| 7,979,552 B1 | 7/2011 | Saraiya et al. | |
| 7,990,858 B2 | 8/2011 | Iny | |
| 8,077,608 B1 * | 12/2011 | Arad et al. | 370/229 |
| 8,218,538 B1 | 7/2012 | Chidambaram et al. | |

(Continued)

OTHER PUBLICATIONS

International Search Report & Written Opinion from PCT/US2012/02057 dated Mar. 19, 2012.

(Continued)

*Primary Examiner* — Hassan Kizou
*Assistant Examiner* — Amy Ling
(74) *Attorney, Agent, or Firm* — Lawrence J. Merkel; Meyertons, Hood, Kivlin, Kowert & Goetzel, P.C.

(57) ABSTRACT

In an embodiment, one or more fabric control circuits may be inserted in a communication fabric to control various aspects of the communications by components in the system. The fabric control circuits may be included on the interface of the components to the communication fabric, in some embodiments. In other embodiments that include a hierarchical communication fabric, fabric control circuits may alternatively or additionally be included. The fabric control circuits may be programmable, and thus may provide the ability to tune the communication fabric to meet performance and/or functionality goals.

21 Claims, 11 Drawing Sheets

(56) References Cited

U.S. PATENT DOCUMENTS

| | | |
|---|---|---|
| 8,493,863 B2 | 7/2013 | Saund et al. |
| 2002/0181395 A1* | 12/2002 | Foster et al. .................. 370/229 |
| 2004/0017820 A1 | 1/2004 | Garinger |
| 2004/0210695 A1* | 10/2004 | Weber et al. .................. 710/240 |
| 2005/0052992 A1 | 3/2005 | Cloonan |
| 2005/0141427 A1 | 6/2005 | Bartky |
| 2005/0249220 A1 | 11/2005 | Olsen et al. |
| 2006/0013133 A1 | 1/2006 | Peng et al. |
| 2006/0092944 A1 | 5/2006 | Wingard |
| 2006/0104298 A1* | 5/2006 | McAlpine et al. ............ 370/412 |
| 2006/0140119 A1 | 6/2006 | Yeh et al. |
| 2007/0109968 A1 | 5/2007 | Hussain et al. |
| 2008/0069125 A1 | 3/2008 | Reed |
| 2008/0159129 A1* | 7/2008 | Songhurst et al. ............ 370/229 |
| 2008/0298397 A1 | 12/2008 | Kwan |
| 2008/0316921 A1 | 12/2008 | Mathews et al. |
| 2009/0010152 A1 | 1/2009 | Ofek et al. |
| 2009/0207866 A1 | 8/2009 | Cholas et al. |
| 2009/0279559 A1 | 11/2009 | Wong et al. |
| 2009/0287865 A1* | 11/2009 | Aldworth et al. ............. 710/110 |
| 2009/0323540 A1* | 12/2009 | Goossens et al. ............. 370/252 |
| 2010/0278195 A1 | 11/2010 | Wagh |
| 2010/0318713 A1 | 12/2010 | Deshpande |
| 2011/0110237 A1* | 5/2011 | Wong et al. .................. 370/236 |
| 2011/0302345 A1* | 12/2011 | Boucard et al. ............... 710/123 |
| 2012/0063313 A1* | 3/2012 | Zhou et al. .................... 370/235 |
| 2012/0072678 A1* | 3/2012 | Biswas et al. ................. 711/154 |
| 2012/0185062 A1 | 7/2012 | Saund et al. |

OTHER PUBLICATIONS

U.S. Appl. No. 13/008,171 entitled "Fabric Limiter Circuits" filed Jan. 18, 2011.

U.S. Appl. No. 13/008,156 entitled "Write Traffic Shaper Circuits" filed Jan. 18, 2011.

U.S. Appl. No. 13/008,184 entitled "Hierarchical Fabric Control Circuits" filed Jan. 18, 2011.

Search report in application No. EP 12150817.0 - 2416 mailed Mar. 2, 2012.

Bolotin E et al: "QNoC: QoS architecture 1-12 and design process for Network on Chip", Journal of Systems Architecture, Elsevier BV, N L, vol. 58,28 February 2884 (2884-82-28), pp. 1-18, XP882619446, ISSN: 1383-7621 * Chapter I and II *.

Notice of Allowance and Fees Due in related U.S. Appl. No. 13/008,184, mailed Jun. 10, 2013, pp. 1-9.

Non-Final Office Action in related U.S. Appl. No. 13/008,171, notification date May 9, 2013, pp. 1-16.

Notice of Preliminary Rejection and translation thereof in KR Application No. 10-2012-5231, Jan. 29, 2013, pp. 1-14.

Non-Final Office Action in Application No. 13/008,184, Jan. 18, 2011, pp. 1-15.

* cited by examiner

QUALITY OF SERVICE (QOS)-RELATED FABRIC CONTROL

BACKGROUND

1. Field of the Invention

This invention is related to the field of digital systems and, more particularly, to interconnecting various components with a communication fabric.

2. Description of the Related Art

Digital systems generally include a variety of components that are interconnected by a communication fabric. The fabric permits the components to communicate with each other to accomplish the operation of the digital system. Exemplary digital systems include computers (e.g. laptops, desktops, servers, workstations, etc.), mobile devices (personal digital assistants, cell phones, smart phones, etc.), special purpose devices (global position system (GPS) devices, music players, etc.), devices embedded in other products (e.g. systems in cars), etc.

Complex systems often include multiple interconnected components with different communications requirements and potentially multiple levels of interconnect in the communication fabric. Designing the fabric to support all of the components and achieve a specified level of performance in such environments is complicated and error prone. Decisions such as the width and speed of various interfaces in the fabric, bandwidth available to various components, structure of the fabric, buffering in the fabric, etc. must be made. Often, these decisions must be made with incomplete information as to what the correct decisions would be. As a result, the communication fabric is either overdesigned (wasting resources) or underdesigned (failing to achieve the desired performance or even impacting the ability to realize functionality) in many cases. In some systems, predesigned fabric circuits can be used to realize the communication fabric. The limitations of the predesigned circuits can also affect the ability to achieve the performance goals of the overall system.

SUMMARY

In an embodiment, one or more fabric control circuits may be inserted in a communication fabric to control various aspects of the communications by components in the system. The fabric control circuits may be included on the interface of the components to the communication fabric, in some embodiments. In other embodiments that include a hierarchical communication fabric, fabric control circuits may alternatively or additionally be included at various levels of the hierarchy. The fabric control circuits may be programmable, and thus may provide the ability to tune the communication fabric to meet performance and/or functionality goals.

A variety of fabric control circuits may be used in various embodiments. For example, fabric control circuits that implement transaction limiting may be used. The fabric limiters may limit the number of outstanding transactions from a given source, or may limit the bandwidth consumed by the source over time. Tuning the limiters within the communication fabric may permit better sharing of the available communications bandwidth, in some embodiments.

Another example is write traffic shapers. When writes are provided from a narrower/slower interface to a wider/faster interface, the traffic shapers may accumulate data before transmitting the writes on the wider/faster interface to avoid wasting bandwidth on the wider/faster interface in some embodiments. Another type of write traffic shaper that may be used in some embodiments is a shaper that prevents one or more additional writes from being transmitted from a source until data from one or more previous writes has been completely transmitted. Such a shaper may prevent a source from capturing too much bandwidth in a given period of time by limiting the number of writes that have been initiated by the source and are waiting for data in the fabric, in some embodiments.

In some embodiments, the system may support quality of service (QoS). Various fabric control circuits may be provided to, for example: assign QoS parameters to transactions that do not include them; override QoS parameters for certain transactions; modify transaction limiters based on higher QoS parameters for transactions from a given source, etc. Such fabric control circuits may enhance the ability of the system to meet QoS requirements in some embodiments.

Some embodiments may include a hierarchical communication fabric in which transactions from two or more sources are merged at a higher level in the fabric. At different levels in the hierarchy, fabric control circuits may be used to control traffic at the given level. For example, fabric control circuits may be used with two or more components that couple to a first fabric circuit, which may itself couple to a second fabric circuit at a second level. In between the first and second level fabric circuits, additional fabric control circuits may be used. Multiple levels of fabric control may provide additional flexibility in tuning the communication fabric.

Various embodiments may implement any combination or subcombination of the above described features, as desired.

BRIEF DESCRIPTION OF THE DRAWINGS

The following detailed description makes reference to the accompanying drawings, which are now briefly described.

Figure 1:
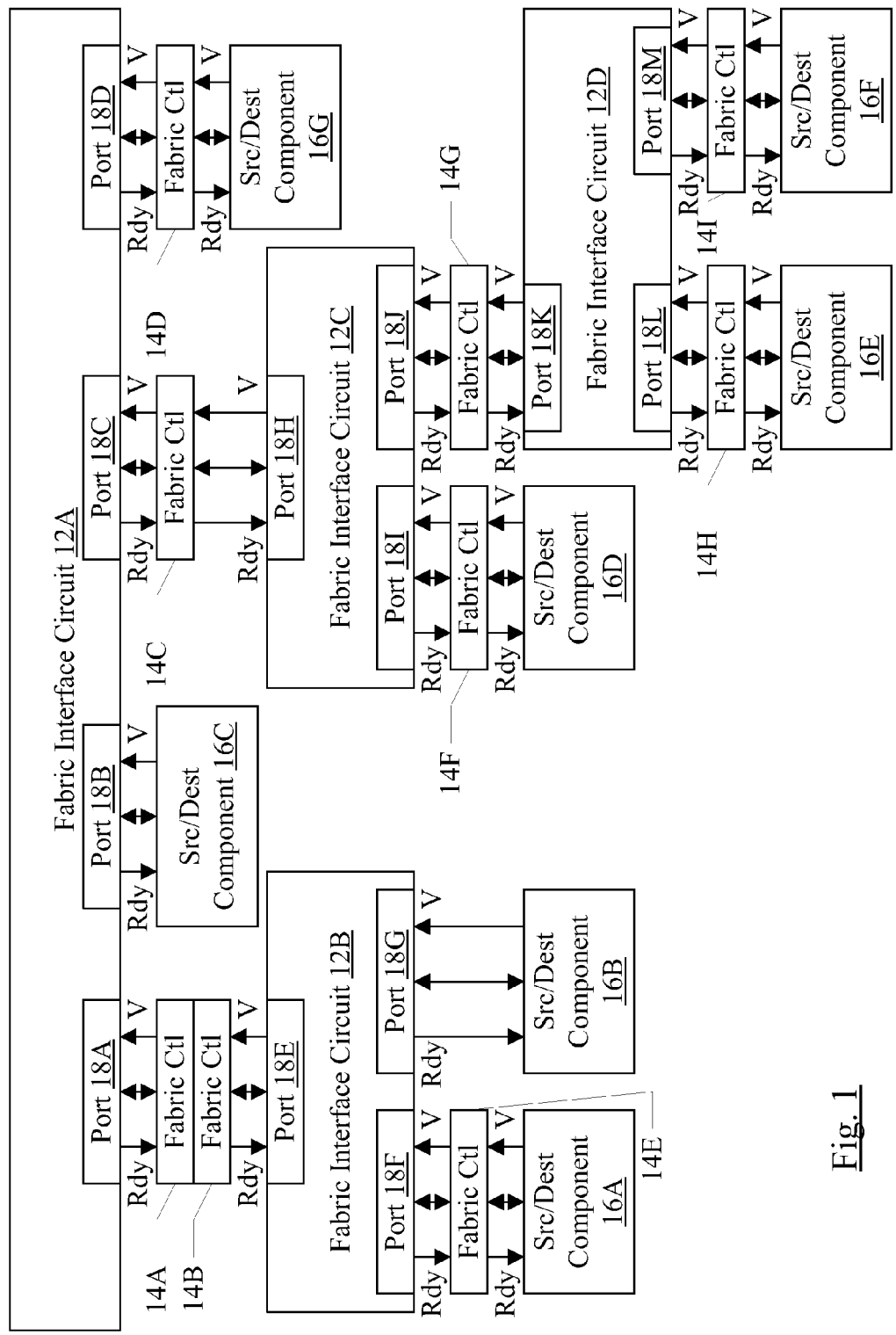
FIG. 1 is a high level block diagram of a system including fabric circuits and fabric control circuits.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Turning now to FIG. 1, a block diagram of one embodiment of a system 10 is shown. In the illustrated embodiment, the system 10 includes multiple fabric interface circuits 12A-12D, multiple fabric control circuits 14A-14I, and multiple source and/or destination (src/dest) components 16A-16G. The fabric interface circuits 12A-12D may form a communication fabric (or a portion of a communication fabric) in the system 10 to permit the components 16A-16G to communication with each other and/or with other components of the system (not shown). For example, the communication fabric may provide the components 16A-16G with access to a memory system (not shown in FIG. 1). More particularly, each fabric interface circuit 12A-12D may include multiple ports (e.g. the ports 18A-18M). Connections between ports and other ports, and ports and components, may be made to form the communication fabric. The fabric control circuits 14A-14I may be configured to control one or more aspects of transmission on the communication fabric. The number of fabric interface circuits 12A-12D, fabric control circuits 14A-14I, and components 16A-16G may vary in various embodiments, and may be more or fewer than those shown in FIG. 1. Additionally, the arrangement of the various circuits and components may vary from that shown in FIG. 1.

In the illustrated embodiment, the component 16A is coupled to the fabric control circuit 14E, which is coupled to the port 18F of the fabric interface circuit 12B. While the fabric control circuit 14E is shown as being coupled to the entire interface of the component 16A and the entire interface of the port 18F, various embodiments need not be so coupled. For example, some embodiments of the fabric control circuit 14E may be coupled to a portion of the interface to the component 16A (and the corresponding portion of the interface to the port 18F), and the remaining portion of the interface may be coupled between the component 16A and the port 18F directly. That is, the remaining portion may not flow through the fabric control circuit 14E. The same may be true for other fabric control circuits, components, and ports in various embodiments as well. Thus, a component or port may be coupled to a fabric control circuit and a port, even though the fabric control circuit may be shown as being coupled to the entire interface for convenience in the drawing. In an embodiment, the portion of the interface to which the fabric control circuits are coupled may include one or more control signals on the interface. The portion may include up to all of the control signals on the interface, or any subset of the control signals, as desired. The address and data transmissions, transaction tags, etc. may be part of the remaining portion of the interface in such embodiments. The portion of the interface to which the fabric control circuit is coupled may be controlled by the fabric control circuit. That is, the fabric control circuit may be configured to modify signals input to the fabric control circuit to generate the corresponding output signal from the fabric control circuit to the receiving port/component. The fabric control circuit may also be coupled to receive an additional portion of the interface for monitoring purposes only (i.e. the fabric control circuit may not modify the additional portion of the interface). The fabric control circuit may thus be configured to generate control signals on behalf of a port/component to control operation on the interface. That is, the fabric control circuit may intercept signals and modify them to present to the receiver.

Some source components may not have any associated fabric control circuits. For example, component 16B in FIG. 1 is coupled to the port 18G without any fabric control circuits. Such components may not require fabric control circuits (e.g. their transaction generation rate may be low enough that the fabric control circuits are not needed, or the component may be designed to self-restrict its transaction generation such that external control is not needed). Alternatively, in hierarchical embodiments such as that shown in FIG. 1, fabric control circuits at a different level of the hierarchy, such as the fabric control circuits 14A-14B in FIG. 1 for the component 16B, may provide sufficient transaction control.

The fabric interface circuit 12B may be configured to route transactions received on the ports 18F and 18G out through the port 18E, which may be coupled to an interface to which the fabric control circuits 14A-14B are coupled. The fabric control circuits 14A-14B are further coupled to the port 18A. Alternatively, as mentioned above, the ports 18A and 18E may be directly coupled for the remaining portion of the interface, except for the portion that the fabric control circuits 14A-14B may be coupled to in order to accomplish the desired transaction control. Similarly, if one or both of the components 16A-16B may be a destination (or slave) of a transaction, the fabric interface circuit may be configured to route transactions received on the port 18E onto one or both of the ports 18F-18G.

Similarly, in FIG. 1: the component 16C is coupled to the port 18B in FIG. 1; the port 18C is coupled to the fabric control circuit 14C and the port 18H; the port 18D is coupled to the fabric control circuit 14D and the component 16G, the port 18H is coupled to the fabric control circuit 14F and the component 16D, the port 18I is coupled to the fabric control circuit 14G and the port 18K, the port 18L is coupled to the fabric control circuit 14H and the component 16E, and the port 18M is coupled to the fabric control circuit 14I and the component 16F.

Generally, the fabric control circuits 14A-14I may be configured to control one or more aspects of transaction transmission on the communication fabric by the components 16A-16G and/or ports 18A-18M to which they are coupled. The fabric control circuits 14A-14I may thus modify the behavior of the traffic in the communication fabric, and may permit the adjustment of performance in the system as a whole. Various fabric control circuits are described below in more detail. Additionally, as illustrated by, e.g., fabric control circuits 14A-14B, two or more fabric control circuits may be used on a given interface and may operate in conjunction to control the communication fabric. In cases where two or more fabric control circuits are used, the controls for each fabric control circuit may be required to be met by a given transaction before that transaction moves forward. For example, a fabric control circuit may limit a number of transactions outstanding, and another fabric control circuit may prevent a new write operation from issuing until the data of a preceding write operation has been transmitted. A new write operation may be prevented from issuing by either of the fabric control circuits.

The fabric control circuits may be programmable (e.g. via software executing on the system 10, or via external control input to the fabric control circuits). The programmability of the fabric control circuits may permit the tuning of the system. In some embodiments, the fabric control circuits may be dynamically programmable during use. Thus, the operation of the fabric control circuits may be changed as the workload in the system changes. Other embodiments may be statically programmable (e.g. during initialization, or "boot", of the system).

In one embodiment, the control signals on the interface include a valid signal (V in FIG. 1) from a master desiring to issue a transaction on the communication fabric and ready signal (Rdy in FIG. 1) from a slave on the interface. A transaction may be initiated if both the valid signal and the ready signal are asserted. Accordingly, in one embodiment, the fabric control circuits 14A-14I may be configured to control transaction issuance by gating the valid and/or ready signals on the interface. That is, the fabric control circuits may modify the valid and/or ready signals (e.g. ensuring that the signals are deasserted) to control transaction issuance. Similarly, valid and ready signals may be associated with a data interface, and a data beat may be transmitted for each clock cycle that both the data ready and data valid signals are asserted. Accordingly, in one embodiment, the fabric control circuits 14A-14I may be configured to control data beat transmissions on an interface by gating/modifying the data valid and/or data ready signals. Interfaces may be bidirectional where a component or port may operate as a master for some transactions and a slave for others. In one embodiment, there may be separate read and write interfaces on the communication fabric. Fabric control circuits 14A-14I may include both read and write versions, or some may apply only to the read interface or only to the write interface. Some fabric control circuits 14A-14I may operate independently on the read and write interfaces, or may jointly operate on the interfaces.

In other embodiments, fabric control circuits 14A-14I may be configured to modify one or more transaction attributes of a transaction. For example, some embodiments of the system may support quality of service (QoS) parameters for transactions. The QoS parameter may specify a QoS level that may be requested for a transaction, and the QoS levels may be used in the system to prioritize traffic to attempt to meet the QoS requirements of the system as a whole. Some components may not be designed to provide QoS parameters, and fabric control circuits may be provided to insert a programmed QoS parameter for such components. Other fabric control circuits may be configured to override QoS parameters provided by components for certain transactions. Other transaction attributes may similarly be modified or inserted (e.g. cacheability, coherence, etc.).

As mentioned above, the fabric interface circuits 12A-12D may include the circuitry to interconnect interfaces on each of the ports to provide a communication fabric. Thus, the fabric interface circuits may include, e.g., buffering at each port to receive transactions, transaction data, etc. and buffer them for transmission on another port. The fabric interface circuits may further include interconnect between the ports, circuitry to control the interconnect (e.g. arbitration). In one embodiment, the fabric interface circuits 12A-12D may be predesigned circuitry purchased by the designer of the system 10 to include in the system 10. The fabric interface circuit 12A-12D may be physical circuitry, or may be "intellectual property" (IP) block which can be purchased from a third party and included in an integrated circuit design, which may be fabricated to include the fabric interface circuits along with the other circuitry. Because the fabric interface circuits are provided by a third party, customization and modification may be limited. Accordingly, the fabric control circuits 14A-14I may provide additional flexibility for tuning the system performance.

Generally, a port may be a communication point on the fabric interface circuits 12A-12D. That is, the port may include the circuitry to communicate on one interface to one or more transaction sources or destinations (e.g. components or other ports). That is, the interface on one port may include a complete communication mechanism for carrying transactions. The interface may be a bus, a packet interface, a point-to-point interface, etc.

A transaction may be one communication on the interface. The transaction may include an address identifying the data affected by the transaction, and may further include the data being transmitted. A read transaction may be a transfer of data from a destination of the transaction to the source, and a write transaction may be a transfer of data from the source to the destination. A transaction may be issued by a source (e.g. a source component) and received by a destination component. The transaction may be considered to be outstanding from the time that the source issues a transaction until the time that the corresponding data is transmitted. A transaction may be complete in response to the transmission of the data. A transaction may have various attributes that further describe the transaction beyond the address and data. Exemplary attributes may include one or more of the following, for example: size (e.g. measured in bytes and/or described by byte enables), cacheability, coherence, the QoS parameters discussed above, etc. In packet-based embodiments, a transaction may include one or more packets. For example, a read request packet and a data response packet may be included in a read transaction. In coherent embodiments, additional packets may be included in the read transaction to ensure coherency (e.g. probe and probe response packets).

A component may include any device or combination of devices that is configured to perform a defined set of operations in the system. Exemplary components may include processors, memory controllers (and associated memory), caches, peripheral devices such as graphics units, video processing units, audio units, networking devices, input/output devices, mass storage devices, etc. Components that may initiate transactions (masters) may be referred to as source components. Components that may be targets of transactions (slaves) may be referred to as destination components. Components that may be both masters and slaves may be referred to as both source and destination components. Any combination of source and destination components may be used in various embodiments.

In an embodiment, the system 10 may be integrated onto a single integrated circuit "chip" as a system on a chip (SOC) configuration. Other embodiments may implement any desired level of integration and/or discrete circuitry.

Various embodiments of fabric control circuits are described in more detail below. Combinations of the various embodiments may be used in various implementations of the systems, and/or the embodiments may be used alone in other implementations of the systems. The embodiments below will use the same reference numerals used in FIG. 1, but without the letter suffixes, since any fabric control circuit embodiment may be used at any point in the system 10 as desired. That is, the fabric control circuits referred to below will be referred to as fabric control circuits 14, with the understanding that any of the fabric control circuits 14A-14I. Similarly a component 16 may be referred to with the understanding that any component 16A-16G may be referred to depending on which fabric control circuit 14A-14I is being referred to; and a port 18 may be referred to with the understanding that any port 18A-18M may be referred to depending on which fabric control circuit 14A-14I is being referred to.

Fabric Limiters

One or more types of fabric limiter circuits may be included in the set of fabric control circuits. The fabric limiters may generally be configured to limit the issuance of transactions based on one or more programmable factors. For example, the fabric limiters may include transaction limiters (which may limit the number of transactions that are outstanding at a given point in time) and bandwidth limiters (which may limit the amount of bandwidth consumed by transactions within a given unit of time).

Figure 2:
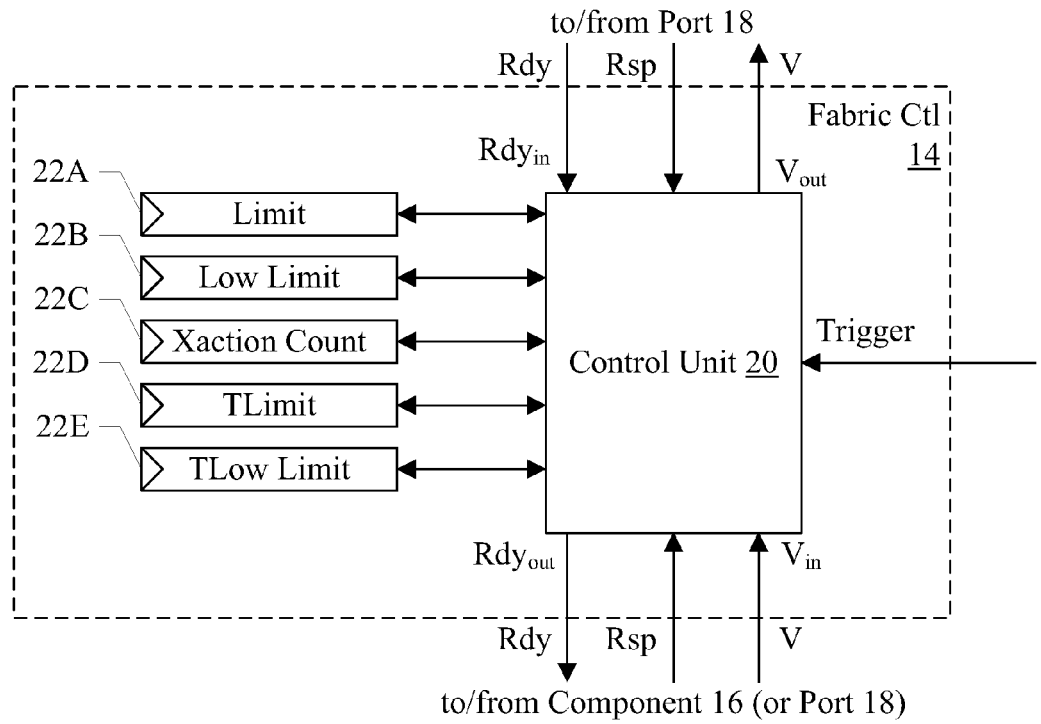
FIG. 2 is a block diagram of one embodiment of a fabric limiter circuit.

FIG. 2 is a block diagram of one embodiment of a fabric control circuit 14 that implements a transaction limiter. In the illustrated embodiment, the fabric control circuit 14 includes a control unit 20 and a set of registers 22A-22E. The control unit 20 is coupled to the registers 22A-22E. Some of the registers 22A-22E may be programmable to set the limits implemented by the transaction limiter. Other registers 22A-22E may be provided to retain state for the control unit 20.

As illustrated in FIG. 2, the transaction limiter is configured to limit the number of outstanding transactions from the component 16 or port 18 that is coupled to the "bottom" of the control unit in FIG. 2. The transaction limiter in this embodiment may accomplish the transaction limit by controlling the valid and ready signals to prevent the controlled component 16/port 18 from issuing new transactions. Accordingly the valid signal from the controlled component 16/port 18 may be received by the controlled component 16/port 18 as an input ($V_{in}$) and the ready signal may be an output to the controlled component 16/port 18 ($Rdy_{out}$). The valid signal to the port 18 may be output ($V_{out}$) and the ready signal to the port 18 ($Rdy_{out}$) at the "top" of FIG. 2 may be received by the control unit 20. Response signals related to the data interface may also be received from both sides (Rsp). For example, there may be a data ready signal and a data valid signal for read transactions and another pair of data ready/data valid signals for write transactions, similar to the ready and valid signals to initiate the transaction. For a read transaction, the data valid may be provided by the port 18 and the data ready signal may be provided by the controlled component 16/port 18. For a write transaction, the data valid signal may be provided by the controlled component 16/port 18 and the data ready signal may be provided by the port 18. It is noted that, while the transaction limiter in this example provides limiting of transactions in one direction, other embodiments may implement transaction limiting in the both directions (or two limiters may be used, one for each direction).

The transaction limit to be applied by the fabric control circuit 14 may be programmed into the limit register 22A. Once the number of transactions outstanding from the controlled component 16/port 18 reaches or exceeds the limit, the control unit 20 may gate the valid and ready output signals to prevent the initiation of additional transactions. As one or more of the outstanding transactions is completed, the control unit 20 may detect the reduced number of outstanding transactions and may cease gating the output signals. Subsequently, additional transactions may be initiated by the controlled component 16/port 18. In the illustrated embodiment, the number of outstanding transactions may be tracked by the control unit 20 in the transaction count register 22C.

In some cases, such as a high bandwidth controlled component, the number of outstanding transactions may rapidly increase to the limit, and then additional transactions may be limited to initiating on a one-to-one basis with transactions completing. To prevent or mitigate this effect, hysteresis may be included in the transaction limiter. Specifically, once the control unit 20 begins gating the valid and ready signals due to the number of outstanding transactions meeting or exceeding the limit programmed into the register 22A, the control unit may be configured to continue gating the valid and ready signals until the number of outstanding transactions drops to or below a second limit (the "low limit") programmed into the register 22B. The low limit may be programmed less than the limit during use. The hysteresis may also result in more "bursty" transactions from such a component, which may be efficient for memory controllers. That is, the high bandwidth component's transactions may occur in bursts rather than issuing one-to-one with completing transactions. The number of transactions in the burst may be, e.g., the difference between the limit and the low limit.

In some embodiments, the fabric control circuit 14 may support dynamic changes to the limits. The dynamic changes may be made in software (e.g. by reprogramming the registers 22A-22B) and the fabric control circuit 15 may be configured to ensure that changes made by software occur without glitching the valid and ready signals during the transition (e.g. due to momentary changes in the gating of the valid and ready signals) and without entering an undefined state which might cause unexpected operation. Alternatively or in addition, the fabric control circuit 14 may support dynamic modifications to the limits in hardware. For example, a second set of limits (TLimit and TLow Limit in the registers 22D-22E in FIG. 2) may be programmed into the fabric control circuit 14. A trigger input may trigger the change in the limits from the limit/low limit pair in the registers 22A-22B to the triggered limit/low limit pair stored in the registers 22D-22E. The trigger may be generated externally due to a condition detected in the system. For example, detecting that the QoS requirements of another component are increasing to higher QoS levels may be a trigger. In an embodiment, the trigger may remain asserted until the return to the normal limits is desired. In another embodiment, the limits may be edge triggered and the trigger may be asserted to switch back and forth between the limits and the TLimits.

The TLimits may be programmed to any values. For example, if the triggering condition is a condition that would benefit from lower limits in the fabric control circuit 14, the TLimits may be programmed to be lower than the normal limits. Examples of such a trigger may include the increasing QoS requirements as mentioned above, detecting that another component is increasing its bandwidth requirements, etc. On the other hand, if the triggering condition is a condition that would benefit from increased limits, the TLimits may be programmed higher than the normal limits. Examples of such a trigger may include another component that is being put to sleep or powered off, detecting decreased bandwidth requirements at the other component, etc.

Figure 3:
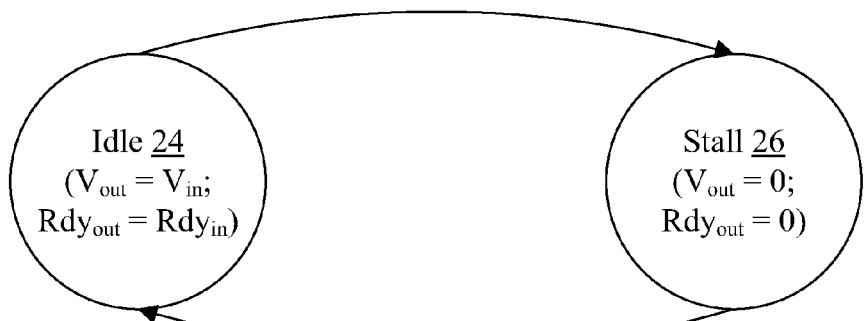
FIG. 3 is a state machine illustrating operation of one embodiment of the fabric limiter circuit shown in FIG. 2.

FIG. 3 is a state machine illustrating one embodiment of the transaction limiter circuit. In the idle state 24, the transaction limiter circuit is not gating the valid and ready signals. Accordingly $V_{out}$ from the control unit 20 is equal to $V_{in}$ to the control unit 20 and $Rdy_{out}$ from the control unit 20 is equal to $Rdy_{in}$ to the control unit 20. Viewed in another way, the valid and ready signals may pass through the transaction limiter circuit while the limiter is in the idle state 24. In the stall state 26, on the other hand, both the $V_{out}$ and the $Rdy_{out}$ signals are gated (set to zero).

The transition from the idle state 24 to the stall state 26 may occur when the transaction count in the register 22C is greater than or equal to the limit. To safely make the transition to the stall state 26 in times that software may be changing the programmed limit, the equation shown in FIG. 3 may be used. That is, if the transaction count is greater than or equal to the limit and the controlled component/port is not attempting to transmit a transaction ($V_{in}$=0), the transition may occur. If the transaction count is greater than or equal to one less than the limit, the controlled component/port is attempting to transmit a transaction ($V_{in}$=1) and the transaction is being permitted ($Rdy_{out}$), the transition may also occur.

The transition from the stall state 26 to the idle state 24 may occur when the transaction count is less then or equal to the low limit and the transaction count is less than the limit. The transaction count may be compared against the limit for the case where hysteresis is not being used and the low limit is not programmed below the limit. The illustrated equation may apply for the hysteresis embodiment. If hysteresis is not being implement, the transition from the stall state 26 to the idle state 24 may be performed if the transaction count is less than the limit. Again, to permit dynamic software modification of the limits the transition from the stat state 26 to the idle state 24 may occur if there is no transaction being attempted by the controlled component/port ($V_{in}$=0) or if the controlled component/port is attempting to transmit a transaction ($V_{in}$=1) and the transaction is being permitted ($Rdy_{out}$).

Figure 4:
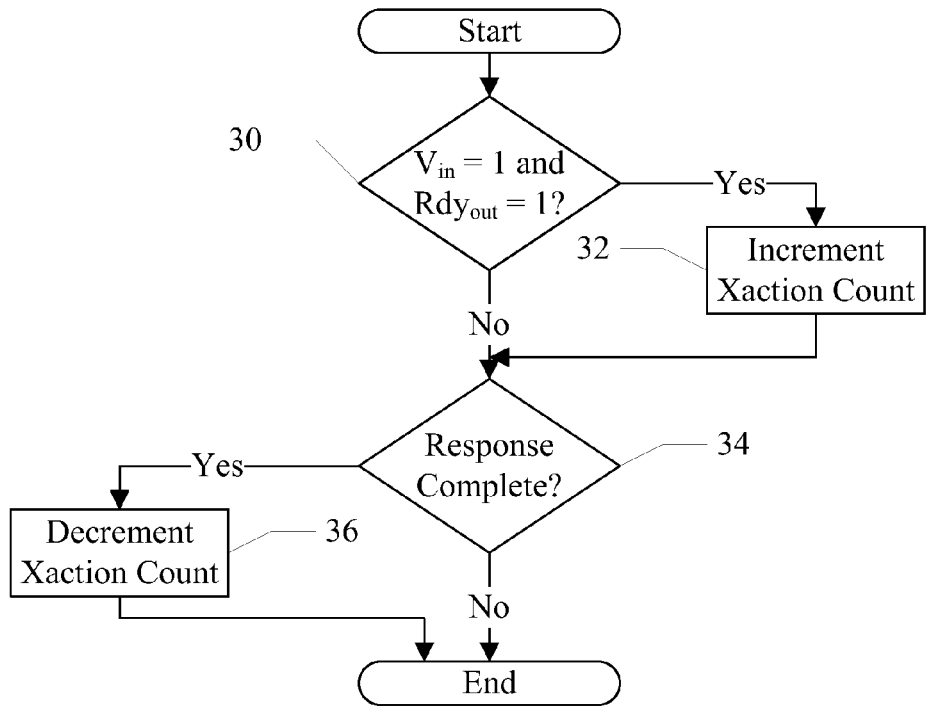
FIG. 4 is a flowchart illustrating additional operation of one embodiment of the fabric limiter circuit shown in FIG. 2.

Turning now to FIG. 4, a flowchart is shown illustrating operation of one embodiment of the fabric control circuit 14 shown in FIG. 2 (and more particularly the control unit 20) to maintain the transaction count in the register 22C. While the blocks are shown in a particular order for ease of understanding, other orders may be used. Blocks may be performed in parallel in combinatorial logic in the fabric control circuit 14/control unit 20. Blocks, combinations of blocks, and/or the flowchart as a whole may be pipelined over multiple clock cycles. The fabric control circuit 14/control unit 20 may be configured to implement the operation shown in FIG. 4.

If the controlled component/port is requesting a transaction ($V_{in}$=1), and the ready is not being gated by the control unit 20 ($Rdy_{out}$=1), a transaction is being transmitted by the controlled component/port (decision block 30, "yes" leg). Accordingly, the control unit 20 may be configured to increment the transaction count in the register 22C (block 32). If the response (data transmission) of an outstanding transaction is completed (decision block 34, "yes" leg), a transaction is completed and the control unit 20 may configured to decrement the transaction count (block 36). Depending on the type of transaction, the response to track for completing a transaction may vary. For example, write operations may be completed by the controlled component/port, while read operations may be completed by the return of data from the port. Since a count is being updated (rather than attempting to track a specific transaction), it may be sufficient to logically OR the responses together. Alternatively, as mentioned previously, some embodiments may implement separate read and write interfaces and the fabric control circuit 14 may only observe the responses for the corresponding transaction type.

Figure 5:
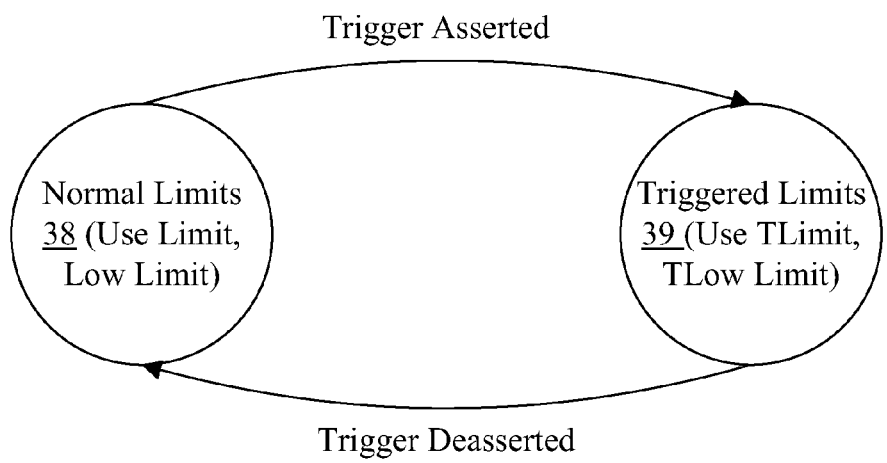
FIG. 5 is a state machine illustrating dynamic modification of limits in one embodiment of the fabric limiter circuit shown in FIG. 2.

Turning next to FIG. 5, a state machine is shown illustrating operation of one embodiment of the fabric control circuit 14/control unit 20 for implementing the dynamic triggering of different limits. The state machine includes a normal limits state 38 and a triggered limits state 39. In the normal limits state 38, the limit and low limit from the registers 22A-22B may be used. In the triggered limits state, the TLimit and TLow Limit from the registers 22D-22E may be used. The transition from the state 38 to the state 39 may occur responsive to assertion of the trigger, and the transition from the state 39 to the state 38 may occur responsive to the deassertion of the trigger. Alternatively, pulses of the trigger may cause the transition in either direction.

Similar to the discussion of the state machine in FIG. 3, the transitions in FIG. 5 may occur if there is no transaction being attempted by the controlled component/port ($V_{in}$=0) or if the controlled component/port is attempting to transmit a transaction ($V_{in}$=1) and the transaction is being permitted ($Rdy_{out}$).

Figure 6:
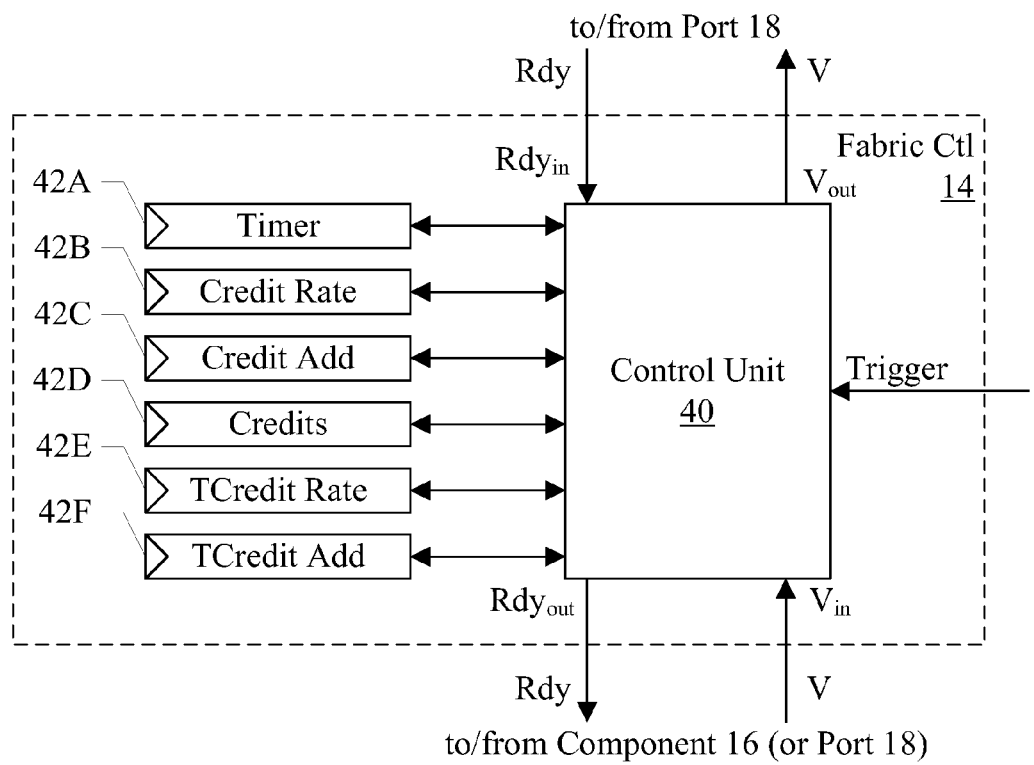
FIG. 6 is a block diagram of another embodiment of a fabric limiter circuit.

Turning now to FIG. 6, a block diagram is shown of one embodiment of a fabric control circuit 14 that implements a bandwidth limiter. In the illustrated embodiment, the fabric control circuit 14 includes a control unit 40 and a set of registers 42A-42F. The control unit 40 is coupled to the registers 42A-42F. Some of the registers 42A-42F may be programmable to set the limits implemented by the transaction limiter. Other registers 42A-42F may be provided to retain state for the control unit 40.

As illustrated in FIG. 6, the bandwidth limiter is configured to limit the amount of bandwidth from the component 16 or port 18 that is coupled to the "bottom" of the control unit in FIG. 6. The bandwidth limiter in this embodiment may accomplish the limit by controlling the valid and ready signals to prevent the controlled component 16/port 18 from issuing new transactions once the allocated bandwidth is consumed for a given unit of time (until that unit of time expires). Accordingly the valid signal from the controlled component 16/port 18 may be received by the controlled component 16/port 18 as an input ($V_{in}$) and the ready signal may be an output to the controlled component 16/port 18 ($Rdy_{out}$). The valid signal to the port 18 may be output ($V_{out}$) and the ready signal to the port 18 ($Rdy_{in}$) at the "top" of FIG. 6 may be received by the control unit 40. As noted above, other embodiments may implement limiting in both directions or limiters may be used for each direction, as desired.

In this embodiment, the bandwidth may be controlled by allocating a number of credits, where each issued transaction consumes one credit. Other embodiments may consume different numbers of credits per transaction (e.g. based on the size of the transaction). The number of credits allocated per unit time may be programmed into the credit add register 42C, and the period of time corresponding to the credits may be programmed into the credit rate register 42B. The period may be measured in terms of clock cycles, real time, or any other desired measure of time.

The control unit 40 may be configured to maintain a timer in the register 42A to measure the passage of time. Each time the "credit rate" amount of time expires, "credit add" credits may be added to the credits remaining to be used. The credits remaining may be stored in the credits register 42D. As transactions are issued, the credits in the credits register may be reduced. If the credits reach zero, the control unit 40 may prevent additional transactions from being issued until the credits become non-zero again (at the expiration of the "credit rate" interval, by adding the "credit add" credits. If the time period expires prior to using all of the available credits, the credits may carry over to the next time interval. That is, the credits may not expire. In other embodiments, the credits may expire and the control unit 40 may initialize the credits register 42D with the credit add value from the register 42C at the expiration of each interval. The credits may also saturate at a maximum value. The maximum value may be programmable or fixed.

In an embodiment, the bandwidth limiter may support the trigger input and changing the limits to the TLimits, similar to the discussion above with regard to FIG. 5. the TLimits may include a TCredit rate in the register 42E and a TCredit add in the register 42F. The TLimits may be greater than or less than the normal limits, as discussed above.

Figure 7:
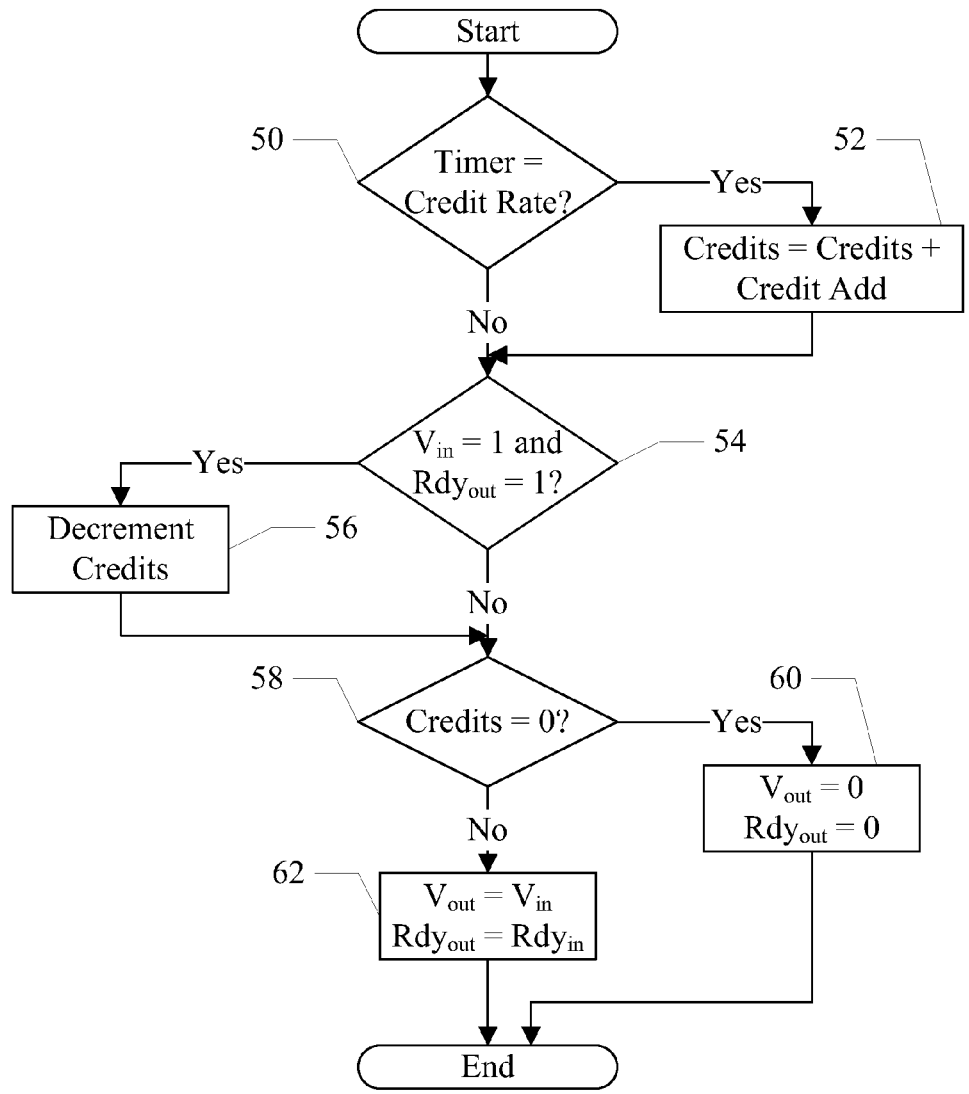
FIG. 7 is a flowchart illustrating operation of one embodiment of the fabric limiter circuit shown in FIG. 6.

Turning now to FIG. 7, a flowchart is shown illustrating operation of one embodiment of the fabric control circuit 14 shown in FIG. 6 (and more particularly the control unit 40). While the blocks are shown in a particular order for ease of understanding, other orders may be used. Blocks may be performed in parallel in combinatorial logic in the fabric control circuit 14/control unit 40. Blocks, combinations of blocks, and/or the flowchart as a whole may be pipelined over multiple clock cycles. The fabric control circuit 14/control unit 40 may be configured to implement the operation shown in FIG. 7.

The control unit 40 may update the timer in the register 42A according to the measurement of time implemented in the fabric control circuit 14 (e.g. incremented once per clock cycle). The timer may be compared to the credit rate programmed in the register 42B, and if the timer is equal to the credit rate, the time period has expired (decision block 50, "yes" leg). The control unit 40 may be configure to add the credits add value from the register 42C to the credits register 42D (block 52).

If a transaction is being permitted ($V_{in}=1$ and $Rdy_{out}=1$— decision block 54, "yes" leg), the control unit 40 may decrement the credits in the credits register 42D (block 56). If the credits in the credits register 42D have been reduced to zero (decision block 58, "yes" leg), the control unit 40 may gate the valid and ready signals ($V_{out}=0$ and $Rdy_{out}=0$) (block 60). Otherwise (decision block 58, "no" leg), the control unit 40 may pass the input signals to the outputs ($V_{out}=V_{in}$ and $Rdy_{out}=Rdy_{in}$) (block 62)

Write Traffic Shapers

Another embodiment of fabric control circuit 14 may be one or more types of write traffic shaper circuits. A first type of write traffic shaper circuit may be used at interfaces in which a lower bandwidth interface from a component or port is coupling to a higher bandwidth port. This write traffic shaper circuit may be referred to as a write data gather circuit. The port may be higher bandwidth if the data width (i.e. the data transferred in one data beat on the port) is wider than the lower bandwidth component/port. In such cases, an upsizer (not shown) may be used to transmit data on the port. The upsizer may capture data from the narrower bus and transmit the data on the correct section of the wider data bus. For example, an upsizer from a narrow data bus to a wider data bus that is twice as wide as the narrower data bus may alternately transmit data on the upper half or lower half of the wider data bus as the data is received by the narrower data bus. However, the upsizer is not designed to accumulate data beats for transmission unless the data bus is occupied by some other transmission. If the wider data bus is available to transmit the data, the upsizer transmits the narrow data and uses byte enables or other validity indicators to identify which part of the wider data bus is transmitting data. The write data gather circuit may be configured to delay initiation of a write transaction until the data from the narrower interface has been collected. Thus, more efficient use of the wider interface may occur. In other cases, a port may be higher bandwidth because it is clocked at a higher clock frequency than the lower bandwidth component/port. In this case, delaying initiation of the write transaction may reduce or avoid clock cycles on the higher bandwidth interface in which no data is transmitted because the next data for a write operation is still being received at the lower bandwidth. Again, better efficiency may be achieved in some embodiments on the higher bandwidth port.

Another type of write traffic shaper may be used to prevent a particular component or port from initiating too many write transactions prior to completing the earliest of the write transactions. This type of write traffic shaper may be referred to as a write request spreader circuit. On a narrow width or slower clocked interface, issuing too many write transactions from one component/port may prevent other components/ports from issuing write transactions until at least a first beat of data is transmitted for each outstanding write transaction (to preserve ordering). If the issuing component/port provides data slowly, long latencies may be incurred by the other components/ports. The write request spreader circuit may be used along with the write gather circuit in some embodiments. For example, if a port is coupled to a mux between a narrow data bus with a write gather circuit and input that is the same width as the port, the wider input may dominate the bandwidth, preventing the narrower input from obtaining sufficient bandwidth. Alternatively, the narrower input may issue too many requests, reducing the available bandwidth for the wider input. The write request spreader circuit may permit one or more write transactions to be issued (up to a defined limit), but then may prevent additional write transactions from the same port/component until the issued write transactions completed (e.g. until all data beats have been transmitted). An embodiment of the write request spreader circuit discussed below restricts issuance of write transactions to one per source component/port. Other embodiments may permit more than one, or may be programmable as to the number to permit.

Figure 8:
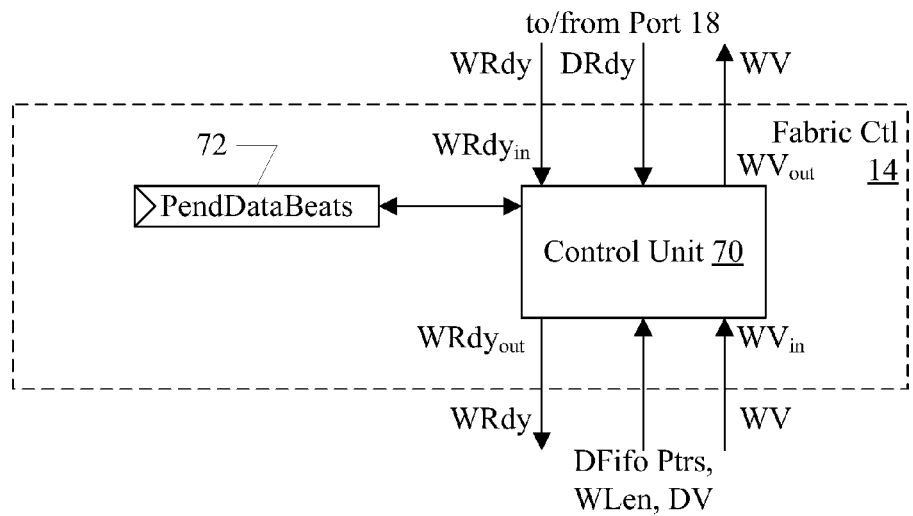
FIG. 8 is a block diagram of one embodiment of a write traffic shaper circuit.

FIG. 8 is a block diagram of one embodiment of a fabric control circuit 14 that may implement a write data gather circuit or a write request spreader circuit. In the embodiment of FIG. 8, the fabric control circuit includes a control unit 70 and a pending data beats register 72. The control unit 70 is coupled to the pending beats register 72. The control unit 70 may also be coupled to the valid and ready signals from the lower bandwidth component/port (at the bottom as shown in FIG. 8) and the higher bandwidth port (at the top shown in FIG. 8). In this embodiment, separate read and write interfaces may be supported by the port and thus the valid and ready signals are part of the write interface (WV and WRdy in FIG. 8). Data valid and data ready (DV and DRdy, respectively) may also be monitored by the control unit 70. Write data may be buffered in a FIFO (e.g. in an upsizer, in the source component or port), and the control unit 70 may monitor the FIFO pointers (DFifo Ptrs in FIG. 8). Additionally, a transaction attribute transmitted with the address of the transaction may be the length of the write (WLen), which may be monitored by the control unit 70 as well.

Figure 9:
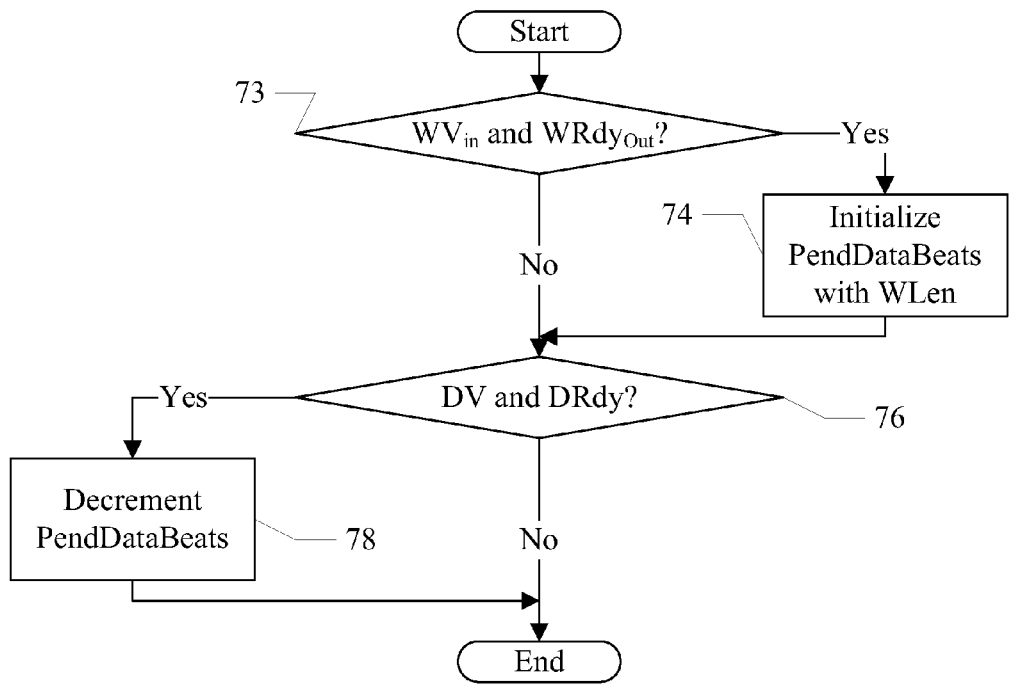
FIG. 9 is a flowchart illustrating operation of one embodiment of the write traffic shaper circuit shown in FIG. 8.

FIG. 9 is a flowchart illustrating operation of one embodiment of the fabric control circuit 14 shown in FIG. 8, and more particularly the control unit 70, to maintain the pending data beasts (PendDataBeats) in the register 72. While the blocks are shown in a particular order for ease of understanding, other orders may be used. Blocks may be performed in parallel in combinatorial logic in the fabric control circuit 14/control unit 70. Blocks, combinations of blocks, and/or the flowchart as a whole may be pipelined over multiple clock cycles. The fabric control circuit 14/control unit 70 may be configured to implement the operation shown in FIG. 9.

If the control unit 70 is permitting a write transaction to be initiated ($WV_{in}$ and $WRdy_{out}$ both=1—decision block 73, "yes" leg), the control unit 70 may initialize the pending data beats register 72 with the number of beats indicated by the WLen transaction attribute (block 74). Alternatively, the register 72 may be initialized with the number of bytes indicated by the WLen register. In cases in which more than one write transaction may be concurrently outstanding, the control unit 70 may add the WLen value to the current value of the register. Thus, in such embodiments, the value in the register 72 may represent the amount of data (beats or bytes) remaining to be transferred for the outstanding write transactions.

If a data transfer is occurring (DV and DRdy both 1—decision block 76, "yes" leg), the control unit 72 may decrement the pending data beats register 72 (block 78). The decrement may a decrement by one if the value in the register 72 represents data beats. If the value represents data bytes, the decrement may be by the size of the transfer (e.g. on the higher bandwidth port).

Figure 10:
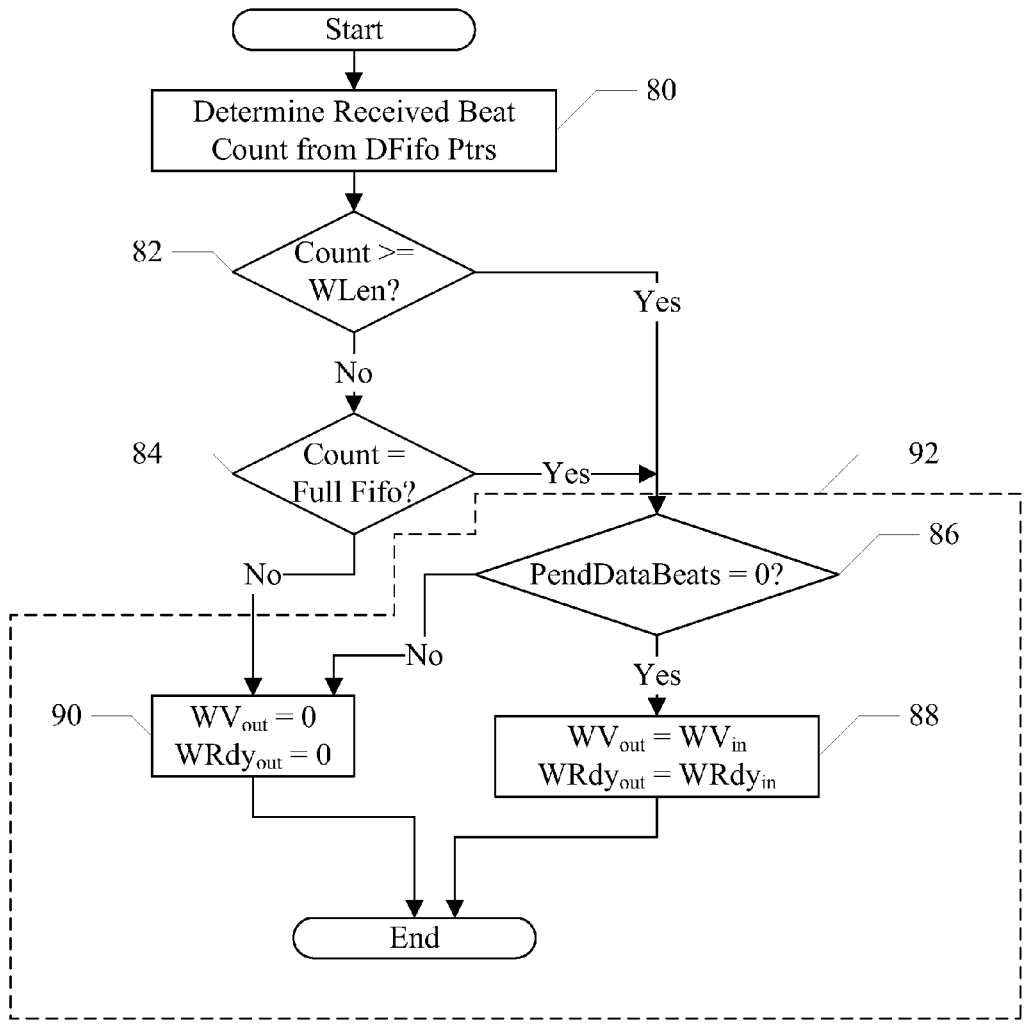
FIG. 10 is a flowchart illustrating additional operation of one embodiment of the write traffic shaper circuit shown in FIG. 8.

Turning now to FIG. 10, a flowchart is shown illustrating operation of one embodiment of the fabric control circuit 14 shown in FIG. 8 (and more particularly the control unit 70) to implement a write data gather circuit. While the blocks are shown in a particular order for ease of understanding, other orders may be used. Blocks may be performed in parallel in combinatorial logic in the fabric control circuit 14/control unit 70. Blocks, combinations of blocks, and/or the flowchart as a whole may be pipelined over multiple clock cycles. The fabric control circuit 14/control unit 70 may be configured to implement the operation shown in FIG. 10.

The control unit 70 may be configured to determine the beat count for data that is stored in the DFifo, responsive to the DFifo pointers (block 80). Alternatively, instead of receiving the DFifo pointers, the control unit 70 may simply receive the beat count. If the count is greater than or equal to the length of the write transaction (WLen) (decision block 82, "yes" leg), the data for the write transaction is ready in the DFifo for transmission. On the other hand, if the DFifo is full (decision block 84, "yes" leg), the write transaction may need to be initiated because the complete data transmission for the write transaction may not be stored in the DFifo. In either case, in this embodiment, the control unit 70 may prevent initiation of a write transaction that is otherwise ready if the preceding write transaction is not completed (pending data beats not equal to zero—decision block 86). If the preceding write transaction is complete (decision block 86, "yes" leg), the control unit 70 may pass the $WV_{in}$ and $WRdy_{in}$ signals to the $WV_{out}$ and the $WRdy_{out}$ signals (block 88). Otherwise (decision blocks 82 and 84, "no" legs or decision block 86, "no" leg), the control unit 70 may gate the $WV_{out}$ and $WRdy_{out}$ signals, preventing the write transaction from issuing (block 90).

An embodiment that implements the write request spreader circuit may be similar, but may only check if the pending data beats are zero. That is, the write request spreader circuit may implement the portion of the flowchart in FIG. 10 that is enclosed by the dotted line 92 (decision block 86 and blocks 88 and 90). However, the write data gather circuit may prevent a particular write transaction from issuing until the data beats for that particular write transaction have been received, while the write request spreader circuit may prevent a particular write transaction from issuing until the data beats from a preceding write transaction have been received.

It is noted that some embodiments of the write data gather circuit and/or the write request spreader circuit may implement additional features to attempt to make more efficient use of the source interface bandwidth. For example, the pending data beats count may be checked for one beat remaining rather than 0, anticipating that the last beat may be transmitted soon and the next write may be started (overlapping the write operations somewhat). Another example may be based on the bandwidth ratio when the busses are operating at the same frequency. The write data gather circuit may check for fewer data beats based on the ratio. For example, the ratio is two, the write data gather circuit may check for half the data beats.

QoS-Related Fabric Control

Various QoS-related fabric control circuits may be included in embodiments. Generally, at least some components 16 in the system 10 may be configured to assign QoS parameters to the transactions they issue. The QoS parameters of the transactions may be used to balance the performance requirements of the components. However, in some cases, one or more components may be designed to provide QoS parameters. In other cases, the QoS parameters assigned by one or more components may not be as desirable as other QoS parameter assignments in view of overall system performance. Fabric control circuits may be provided to provide and/or change QoS parameters in such cases. Additionally, QoS parameters may be used to trigger modified limits in other fabric control circuits, as discussed in more detail below.

Generally, the QoS parameter may be a transaction attribute which may identify a requested level of service for the transaction. Transactions with QoS parameter values requesting higher levels of service may be given preference over transactions requesting lower levels of service. The preference may be applied at the various fabric interface circuits 12, or at a destination component 16 that is targeted by transactions, or both. Thus, a given source component may be configured to use QoS parameters to identify which transactions are more important to the source component (and thus should be serviced prior to other transactions from the same source component, for example), especially for sources that support out-of-order data transmissions with respect to the address transmissions from the source component. Furthermore, the QoS parameters may permit sources to request higher levels of service than other sources on the same port and/or source components on other ports.

In some embodiments, different traffic types may have different definitions of QoS parameters. That is, the different traffic types may have different sets of QoS parameters. For example, a set of real time QoS parameters may be defined for real time transactions and a set of non-real time QoS parameters may be defined for non-real time transactions. The fabric interface circuits 12 and/or destination components 16 may be configured to process the QoS parameters and may be configured to use the relative QoS parameter values to schedule transactions for service.

As an example, the real time QoS parameters may include green, yellow, and red levels indicating increasing needs for low latency data at each level. Thus, the green level may be lowest priority of the real time QoS parameters, the yellow level may be medium priority, and the red level may be highest priority. The non-real time QoS parameters may include a best effort level and a low latency level viewed as higher than the best effort level. The best effort level may be viewed as lower than each of the real time levels. The low latency level may be dynamically varied between being equal to the green level or the yellow level, in some embodiments, based on the overall state of the system. Other embodiments may implement any set or sets of QoS parameters, as desired.

In some embodiments, QoS parameters may be upgraded for pending transactions. Various upgrade mechanisms may be supported. For example, the QoS parameters for pending transactions from a source component 16 may be upgraded if a subsequent transaction from that source component 16 are issued with a higher QoS parameter. Transactions having a lower QoS level may be pushed by transactions having a higher QoS level, in an embodiment. As another example, a sideband interface from one or more source components may be supported to upgrade QoS parameters by transmitting an upgrade request on the sideband interface. In another example, the relative age of pending transactions may be used to upgrade QoS parameters.

Figure 11:
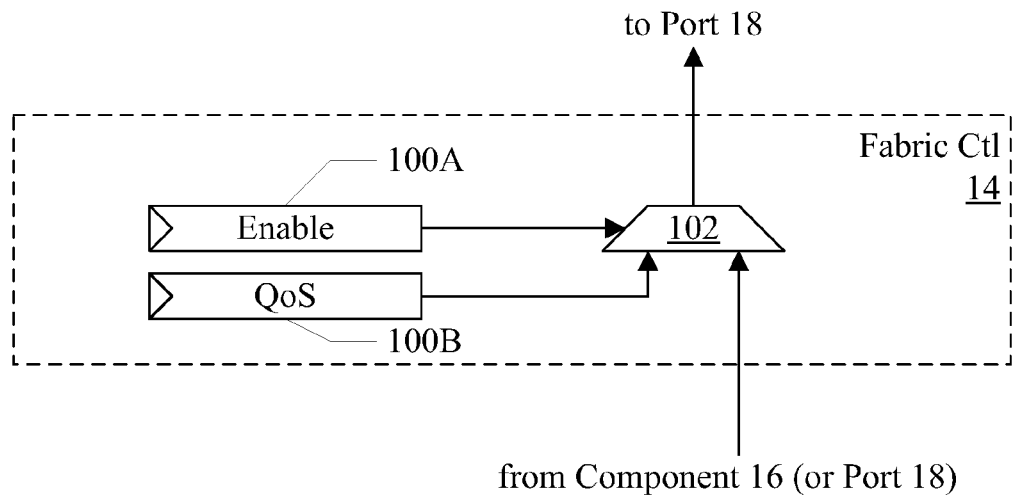
FIG. 11 is a block diagram of one embodiment of a programmable QoS fabric control circuit.

Turning next to FIG. 11, an embodiment of a fabric control circuit 14 that may be used to provide a QoS parameter for a transaction is shown. In the illustrated embodiment, the fabric control unit 14 includes an enable register 100A, a QoS register 100B, and a multiplexor (mux) 102 coupled to the registers 100A-100B. Particularly, the enable register 100A may be coupled to the selection control of the mux 102 and the QoS register 100B may be coupled as an input to the mux 102. The other input of the mux 102 may be coupled to the portion of the interface from the controlled component 16/port 18 (at the bottom of FIG. 11) that carries the QoS parameter and the output of the mux 102 may be coupled to the corresponding portion of the interface to the port 18 at the top of FIG. 11.

The QoS fabric control circuit 14 in FIG. 11 may be used to provide a programmed QoS parameter for a source component 16 that is not, itself, designed to provide a QoS parameter. The QoS fabric control circuit 14 may also be used at a port 18 that is configured to transmit transactions from one or more source components, all of which are not designed to provide QoS parameters. If the enable register 100A is programmed to enable the fabric control circuit 14, the mux 102 may be configured to select the QoS parameter programmed into the QoS register 100B. Otherwise, the QoS parameter received from the controlled component 16/port 18 may be selected by the mux 102.

Figure 12:
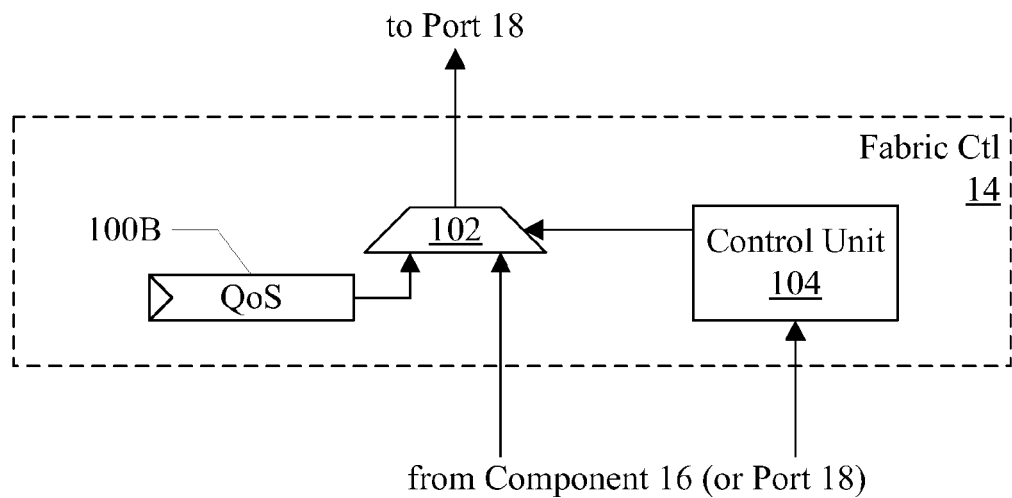
FIG. 12 is a block diagram of one embodiment of a QoS override fabric control circuit.

FIG. 12 is a block diagram of another embodiment of a fabric control circuit 14 that may override a QoS parameter from a source component 16 or a port 18 based on one or more other transaction attributes. In the illustrated embodiment, the fabric control circuit 14 may include a QoS register 100B and a mux 102 similar to the embodiment of FIG. 11, and a control unit 104. Similar to the embodiment of FIG. 11, the QoS register 100B is coupled to an input of the mux 102, the other input of the mux 102 is coupled to the portion of the interface from the controlled component 16/port 18 the carries the QoS parameter, and the output of the mux 102 is coupled to the portion of the interface to the port 18 that carries the QoS parameter. The selection control of the mux 102 is coupled to the control unit 104, which is coupled to receive one or more transaction attributes of the transaction from the controlled component 16/port 18. In some embodiments, the transaction attributes received by the control unit 104 may also include the QoS parameter.

The embodiment of FIG. 12 may override the QoS parameter assigned by the source component 16 with the QoS parameter programmed into the QoS register 100B. The programmed QoS parameter may indicate a higher QoS level or a lower QoS level than the QoS that is being overridden, as desired. For example, a higher QoS level may be selected for certain transactions to benefit overall performance. In one implementation, a translation miss for an address of a transaction may result in one or more read transactions to read translations tables for the missing translation data. Since many transactions may subsequently use the translation, it may be beneficial to transmit these read transactions with a higher QoS level than other transactions. The transaction attributes decoded by the control unit 104 to detect the override may include a transaction type of read and other attributes that identify the read as a translation read. As another example, transactions issued by a controlled port may include transactions sourced by components that assigns QoS parameters and other transactions that are sourced by components that do not assign QoS parameters. A transaction identifier may identify the source, and may be a transaction attribute that may be used to determine whether or not an override is used. In general, any transaction attributes may be analyzed in various embodiments.

Figure 13:
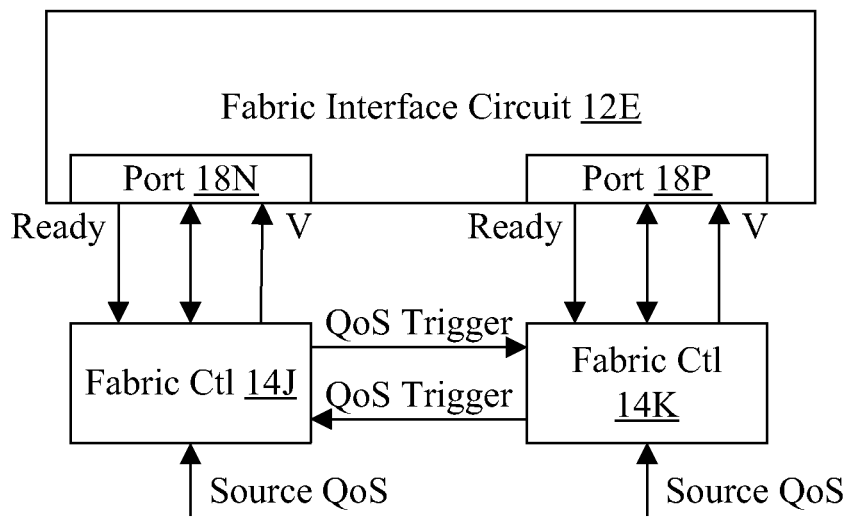
FIG. 13 is a block diagram illustrating one embodiment of dynamic modification of fabric control circuit parameters in response to QoS parameters.

Turning next to FIG. 13, a block diagram of one embodiment of a fabric interface circuit 12E having ports 18N and 18P coupled to fabric control circuits 14J and 14K is shown, respectively, is shown. The fabric control circuit 14J is coupled to provide a QoS trigger signal to the fabric control circuit 14K, which in turn is configured to provide a QoS trigger signal to the fabric control circuit 14K. Each fabric control circuit 14J-14K is coupled to receive a source QoS parameter with a transaction from the source (component or port) that is coupled to communicate with the respective port 18N or 18P.

The fabric control circuits 14J-14K may be various types of fabric limiters, such as transaction limiters or bandwidth limiters. Each fabric control circuit 14J-14K may be configured to signal the other fabric control circuit if the QoS parameter of a received transaction from the source meets/exceeds a QoS threshold. In response to the asserted trigger, the fabric control circuit 14J-14K the receives the asserted trigger may switch using the TLimits. By programming the TLimits to be lower than the normal limits, the receiving fabric control circuit 14J-14K may reduce its limits in response to the asserted trigger and thus the increasing QoS requirements on the asserting fabric control circuit 14J-14K may permit the component 16/port 18 that is experienced increased QoS requirements to effectively receive more bandwidth through the fabric interface circuit 12E since the other component/port may use less. In some embodiments, multiple thresholds and multiple sets of TLimits may be supported, allowing even further reduced limits as QoS thresholds are met/exceeded. For example, an embodiment that implements real time green, yellow, and red levels may have both the yellow and red levels as thresholds, and the TLimits for the red threshold may be lower than the TLimits for the yellow threshold. The thresholds for QoS levels may be programmable in the fabric control circuit 14J-14K, or may be fixed. In yet another embodiment, the QoS thresholds may be used system-wide for bandwidth management. For example, a table of TLimits may be programmed based on the number of source components that have crossed one or more QoS thresholds. As the number of source components transmitting at yellow or red QoS levels increases (for example), the TLimits across the various limiters may be updated based on the values in the table.

Figure 14:
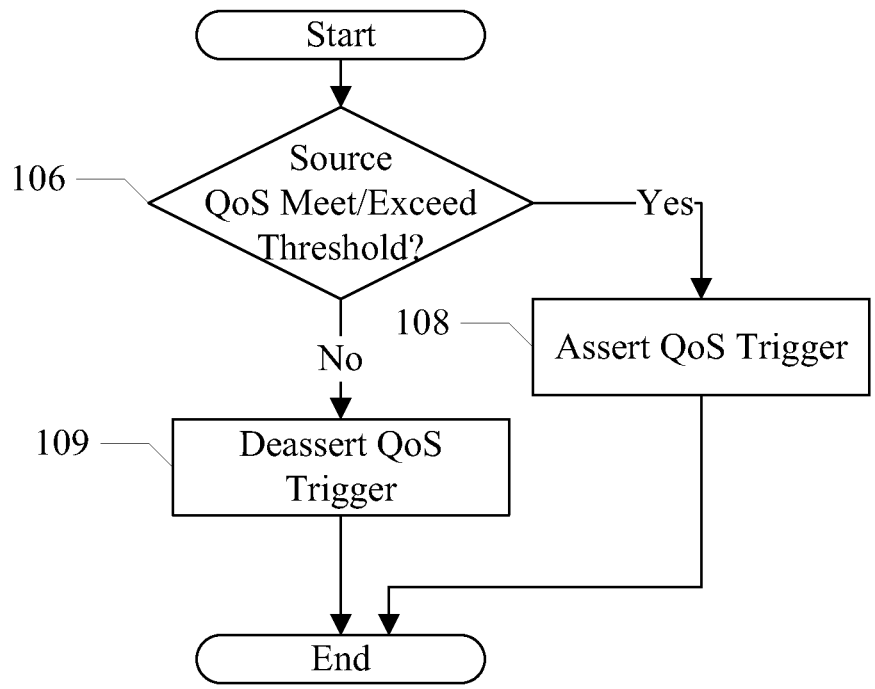
FIG. 14 is a flowchart illustrating operation of one embodiment of the fabric control circuits shown in FIG. 13.

FIG. 14 is a flowchart illustrating operation of one embodiment of the fabric control circuits 14J-14K to generate the QoS trigger signal. The response to an asserted trigger signal may be similar to FIG. 5. While the blocks are shown in a particular order for ease of understanding, other orders may be used. Blocks may be performed in parallel in combinatorial logic in the fabric control circuit 14J-14K. Blocks, combinations of blocks, and/or the flowchart as a whole may be pipelined over multiple clock cycles. The fabric control circuit 14J-14K may be configured to implement the operation shown in FIG. 14.

If the source QoS meets or exceeds the threshold QoS level (decision block 106, "yes" leg), the fabric control circuit 14J-14K may assert the QoS trigger signal (block 108). Otherwise (decision block 106, "no" leg), the fabric control circuit 14J-14K may deassert the QoS trigger signal (block 109).

Hierarchical Fabric Control

Figure 15:
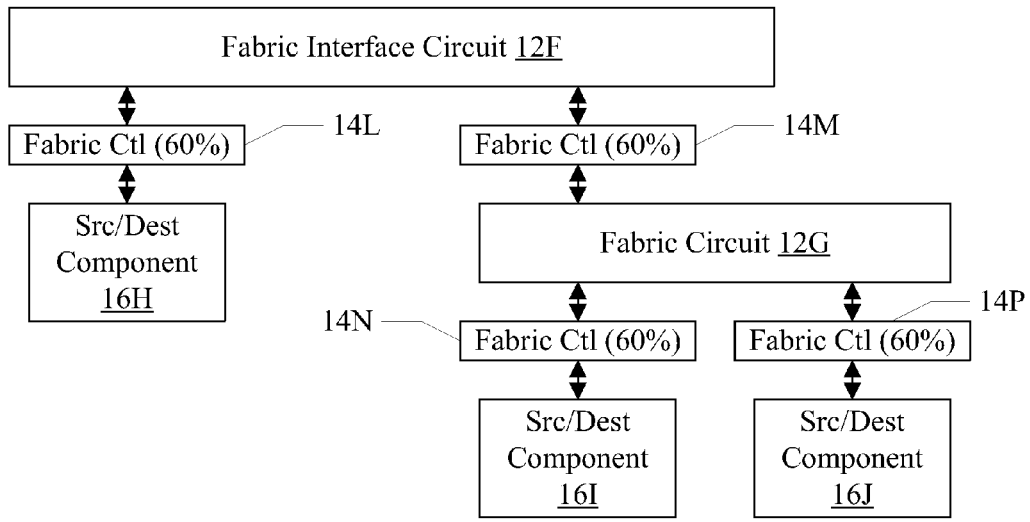
FIG. 15 is a block diagram of one embodiment of hierarchical fabric control circuits.

Turning now to FIG. 15, a block diagram of a portion of a system including fabric interface circuits 12F-12G, fabric control circuits 14L, 14M, 14N, and 14P, and components 16H-16J is shown. The fabric interface circuits 12F-12G may include ports, similar to other fabric interface circuits described herein. In the illustrated embodiment, the component 16H is coupled to the fabric control circuit 14L which is coupled to the fabric interface circuit 12F. The components 16I-16J are coupled to the fabric control circuits 14N and 14P, respectively, which are coupled to the fabric interface circuit 12G. The fabric interface circuit 12G is coupled to the fabric control circuit 14M, which is coupled to the fabric interface circuit 12F. As discussed previously, the components 16H-16J and the fabric interface circuits 12F-12G may be coupled directly for a portion of the interfaces that are not intercepted by the fabric control circuits 14L, 14M, 14N and 14P. The fabric control circuits 14L, 14M, 14N, and 14P may implement any fabric controls, including any of the embodiments described above such as bandwidth limiters, transaction limiters, write traffic shapers, etc.

The hierarchical structure shown in FIG. 15 illustrates how multiple levels of fabric control circuits 14 may be used to provide additional flexibility and control for various requestors. For example, the fabric control circuits may be programmed to permit up to a certain amount of bandwidth consumption from the requestors they control (e.g. through transaction limits or bandwidth limits). The total amount programmed across that fabric control circuits that couple to a given fabric interface circuit may, in total, be programmed for a larger amount of bandwidth than is actually available. Such programming is referred to as "oversubscribing." For example, each of the fabric control circuits 14N and 14P are programmed to permit up to 60% of the bandwidth available to the fabric interface circuit 12G to be consumed by the corresponding components 16I-16J. Accordingly, if one of the components 16I-16J is not generating very many transactions during a given period of time, the other component 16I-16J may use some of the idle bandwidth. Similarly, at the next higher level, the fabric control circuits 14L-14M provide control into the fabric interface circuit 12F (and may also be oversubscribed). Since there are a number of controls available in the hierarchical system, tuning may be performed at multiple levels to optimize the performance.

Figure 16:
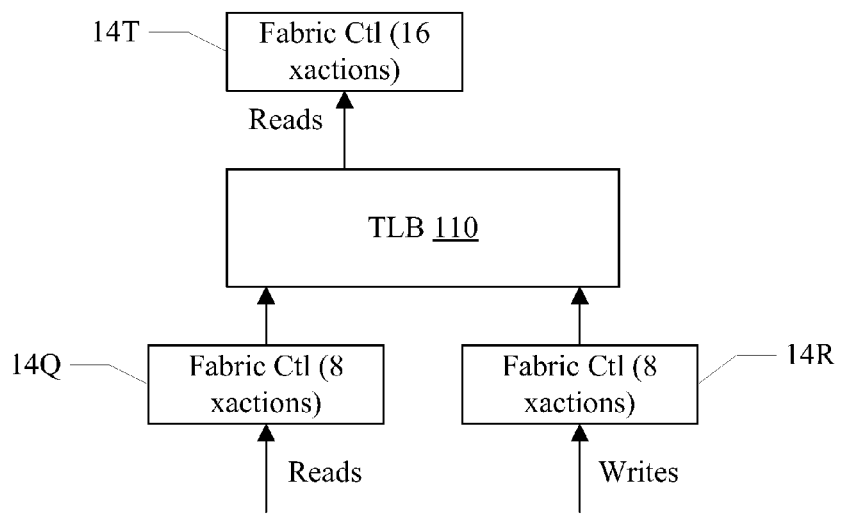
FIG. 16 is a block diagram of one embodiment of hierarchical fabric control circuits for bottleneck resolution.

The hierarchical fabric control may also be used to overcome bottlenecks in the system. For example, FIG. 16 is a block diagram illustrating one embodiment of a translation lookaside buffer 110 configured to perform address translation for read transactions and write transactions. Each of the read transactions and write transactions are subject to a transaction limit (e.g. 8 transactions) via fabric control circuits 14Q and 14R in FIG. 16. However, the TLB 110 may experience TLB misses for the read and write transactions. Particularly for write transactions, the TLB misses cause the TLB to generate one or more read transactions, which could conflict with the read transactions received by the TLB through the fabric control circuit 14Q. By setting the transaction limit of a second level of fabric control (e.g. fabric control circuit 14T in FIG. 16) higher (e.g. 16 transactions), the bottleneck may be alleviated.

System and Computer Accessible Medium

Figure 17:
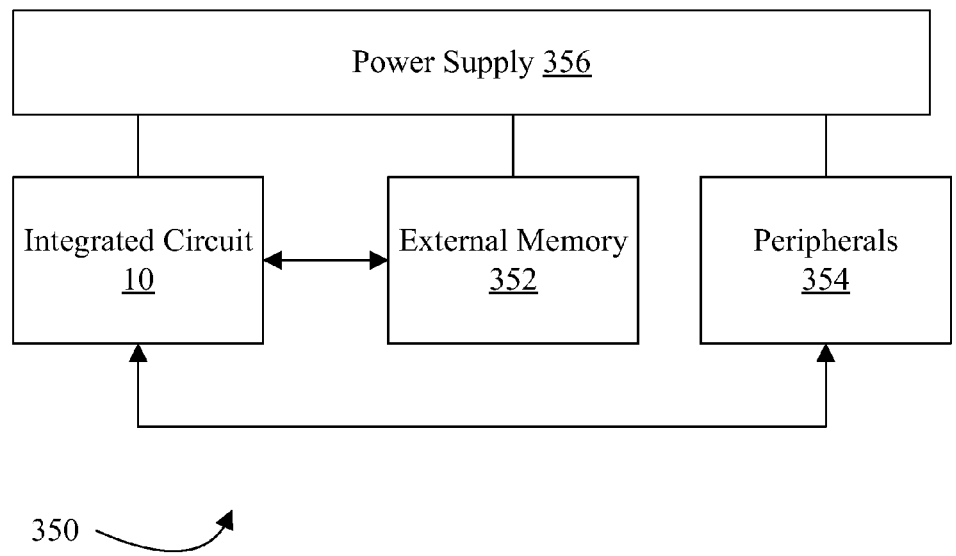
FIG. 17 is a block diagram of one embodiment of a system.

Turning next to FIG. 17, a block diagram of one embodiment of a system 350 is shown. In the illustrated embodiment, the system 350 includes at least one instance of the system 10 coupled to external memory 352. In an embodiment, the system 10 may be an integrated circuit 10. The integrated circuit 10 may also be an integrated circuit incorporating some or all of the components shown in FIG. 1, for example. The integrated circuit 10 is coupled to one or more peripherals 354. A power supply 356 is also provided which supplies the supply voltages to the integrated circuit 10 as well as one or more supply voltages to the memory 352 and/or the peripherals 354. In some embodiments, more than one instance of the integrated circuit 10 may be included (and more than one external memory 352 may be included as well).

The memory 352 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMM5), etc. Alternatively, the devices may be mounted with the integrated circuit 10 in a chip-on-chip configuration, a package-on-package configuration, or a multi-chip module configuration.

The peripherals 354 may include any desired circuitry, depending on the type of system 350. For example, in one embodiment, the system 350 may be a mobile device (e.g. personal digital assistant (PDA), smart phone, etc.) and the peripherals 354 may include devices for various types of wireless communication, such as wifi, Bluetooth, cellular, global positioning system, etc. The peripherals 354 may also include additional storage, including RAM storage, solid state storage, or disk storage. The peripherals 354 may include user interface devices such as a display screen, including touch display screens or multitouch display screens, keyboard or other input devices, microphones, speakers, etc. In other embodiments, the system 350 may be any type of computing system (e.g. desktop personal computer, laptop, workstation, net top etc.).

Figure 18:
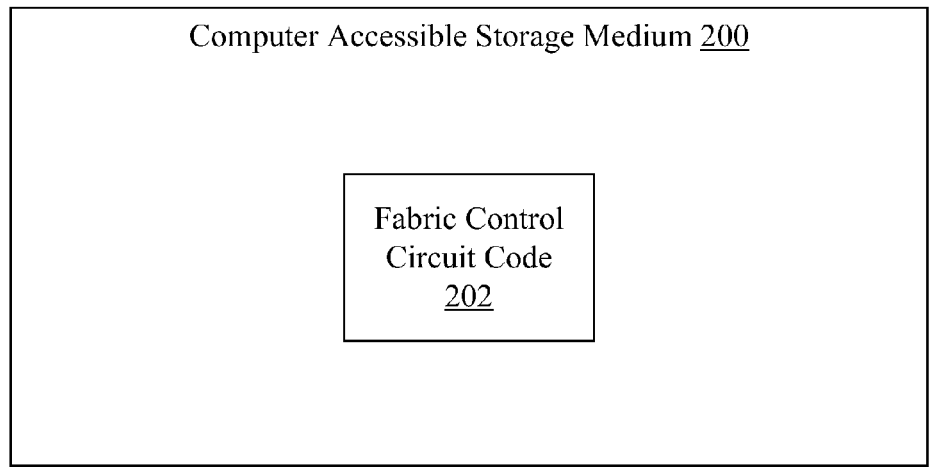
FIG. 18 is a block diagram of one embodiment of a computer accessible storage medium.

Turning now to FIG. 18, a block diagram of one embodiment of a computer accessible storage medium 200 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, a flash memory interface (FMI), a serial peripheral interface (SPI), etc. Storage media may include microelectromechanical systems (MEMS), as well as storage media accessible via a communication medium such as a network and/or a wireless link. The computer accessible storage medium 200 in FIG. 18 may store fabric control circuit code 202. The fabric control circuit code 202 may include instructions which, when executed, program the various fabric control circuits 14 described herein. The fabric control code 202 may program the circuits 14 during boot, and may include instructions to dynamically reprogram the circuits 14 during operation in some embodiments. A carrier medium may include computer accessible storage media as well as transmission media such as wired or wireless transmission.

Numerous variations and modifications will become apparent to those skilled in the art once the above disclosure is fully appreciated. It is intended that the following claims be interpreted to embrace all such variations and modifications.

What is claimed is:

1. A fabric control circuit comprising:
a register programmable with a quality of service (QoS) parameter; and
a multiplexor coupled to the register and coupled to receive a portion of a first interface on which the QoS parameter is transmitted, wherein a first transaction is transmitted on the first interface to a first port on a fabric interface circuit, and wherein an output of the multiplexor is coupled to the portion of the first port on which the QoS parameter is received by the first port, and wherein a remaining portion of the first interface except for the portion of the first interface on which the QoS parameter is transmitted is coupled directly to the first port, and wherein the fabric control circuit is configured to select, through the multiplexor, between the QoS parameter in the register and the QoS parameter received on the first portion of the first interface to transmit as the QoS parameter to the first port during a time that the remaining portion of the first transaction is being transmitted directly to the first port from a source of the first transaction.

2. The fabric control circuit as recited in claim 1 further comprising a second register programmable with a selection control, wherein an output of the second register is coupled to a select input of the multiplexor.

3. The fabric control circuit as recited in claim 1 further comprising a control unit coupled to a select input of the multiplexor and coupled to receive one or more transaction attributes from the first interface, and wherein the control unit is configured to generate a selection control on the select input responsive to the one or more transaction attributes.

4. The fabric control circuit as recited in claim 3 wherein the QoS parameter programmed in the register indicates a higher level of service than the received QoS parameter.

5. The fabric control circuit as recited in claim 4 wherein the control circuit is configured to override the received QoS parameter with the programmed QoS parameter responsive to the transaction attributes indicating a predetermined transaction type.

6. A method comprising:
issuing a first transaction from a source component, the source component transmitting a first quality of service (QoS) parameter with the first transaction;
receiving the first QoS parameter and one or more other transaction attributes of the first transaction in a fabric control circuit;
responsive to the other transaction attributes, overriding the first QoS parameter for the first transaction with a second QoS parameter programmed into the fabric control circuit; and
transmitting the second QoS parameter from the fabric control circuit to the first port on a fabric interface circuit, wherein a remaining portion of the first transaction except for a QoS parameter of the first transaction is transmitted directly from the source component to the first port, and wherein the overriding and the transmitting the second QoS parameter occur during a time that the remaining portion of the first transaction is transmitted directly from the source component to the fabric control circuit.

7. The method as recited in claim 6 wherein the second QoS parameter indicates a higher level of service than the first QoS parameter.

8. The method as recited in claim 6 wherein the second QoS parameter indicates a lower level of service than the first QoS parameter.

9. The method as recited in claim 6 further comprising:
issuing a second transaction from the source component, the source component transmitting a third quality of service (QoS) parameter with the second transaction;
receiving the third QoS parameter and one or more other transaction attributes of the second transaction; and
responsive to the other transaction attributes of the second transaction, the fabric control circuit passing the third QoS parameter through for the second transaction.

10. A method comprising:
issuing a first transaction on a first interface by a source component to a first port on a fabric interface circuit;
assigning a quality of service (QoS) parameter by a fabric control circuit coupled to the first interface, wherein the fabric control circuit assigns the QoS parameter because the source component does not transmit QoS parameters with transactions; and
transmitting the assigned QoS parameter to the first port, wherein a remaining portion of the first transaction except for a QoS parameter of the first transaction is received on the first port directly from the source component, and wherein the assigning and the transmitting occurs during a time that the remaining portion is being directly transmitted from the source component to the first port.

11. The method as recited in claim 10 further comprising programming a register in the fabric control circuit with the QoS parameter to be assigned to transactions from the source component.

12. The method as recited in claim 11 further comprising programming an enable register in the fabric control circuit to enable the fabric control circuit.

13. A system comprising:
a fabric interface circuit having a first port and a second port;
a first fabric control circuit coupled to the first port and coupled to receive a first quality of service (QoS) parameter; and
a second fabric control circuit coupled to the second port and coupled to receive a second QoS parameter;
wherein each QoS parameter specifies a level of service requested by a source of a corresponding transaction, and wherein the first fabric control circuit is configured to detect that the first QoS parameter exceeds a threshold level of QoS, and wherein the first fabric control circuit is configured to signal the second fabric control in response to detecting that the first QoS parameter exceeds the threshold level, and wherein the second fabric control circuit is programmable with a plurality of limits for transactions issued on the second port, and wherein the second fabric control circuit is configured to reduce at least one limit for transactions issued on the second port responsive to the signal from the first fabric control circuit by selecting one of the plurality of limits that is different from a currently-selected limit of the plurality of limits.

14. The system as recited in claim 13 wherein the second fabric control circuit is configured to detect that the second QoS parameter exceeds the threshold level, and wherein the second fabric control circuit is configured to signal the first fabric control circuit responsive to detecting that the second QoS parameter exceeds the threshold level, and wherein the first fabric control circuit is programmable with a second plurality of limits for transactions issued on the first port, and wherein the first fabric control circuit is configured to reduce at least one limit for transactions issued on the first port responsive to the signal from the second fabric control circuit by selecting one of the second plurality of limits that is different from a second currently-selected limit of the second plurality of limits.

15. The system as recited in claim 13 further comprising a first source component coupled to the first port and a second source component coupled to the second port.

16. The system as recited in claim 13 wherein the first fabric control circuit is configured to detect that the first QoS parameter is below the threshold, and wherein the first fabric control circuit is configured to deassert the signal to the second fabric control circuit in response to detecting that the first QoS parameter is below the threshold.

17. The system as recited in claim 16 wherein the second fabric control circuit is configured to revert the at least one limit to a higher level responsive to deassertion of the signal from the first fabric control circuit by selecting the higher level from the plurality of limits.

18. A system comprising:
a fabric interface circuit having at least a first port;
a source component coupled to the first port and configured to issue transactions to the first port; and
a fabric control circuit coupled to a first portion of a first interface to the first port from the source component, the first portion corresponding to a quality of service (QoS) parameter received by the first port, and wherein the fabric control circuit is configured to select between a first QoS parameter in the fabric control circuit and a value received on the first portion of the first interface to transmit as the QoS parameter to the first port, wherein a remaining portion of the first interface except for the first portion is coupled directly from the source component to the first port and wherein the fabric control circuit is configured to select between the first QoS parameter and the value to transmit as the QoS parameter to the first port during a time that the remaining portion is transmitted directly from the source component to the first port.

19. The system as recited in claim 18 wherein the fabric control circuit is programmable with the first QoS parameter.

20. The system as recited in claim 19 wherein the fabric control circuit is further programmable with an enable that causes the selection of the first QoS parameter.

21. The system as recited in claim 19 wherein the fabric control circuit is further coupled to receive one or more transaction attributes from the source component, and wherein the fabric control circuit is configured select between the first QoS parameter and the value responsive to the one or more transaction attributes.

* * * * *